United States Patent [19]

Okura

[11] 4,071,850
[45] Jan. 31, 1978

[54] CAMERA LENS BARREL SUITABLE FOR FLASH PHOTOGRAPHY

[75] Inventor: Zenichi Okura, Ichikawa, Japan

[73] Assignee: Asahi Kogaku Kogyo Kabushiki Kaisha, Tokyo, Japan

[21] Appl. No.: 571,254

[22] Filed: Apr. 24, 1975

[30] Foreign Application Priority Data

May 9, 1974 Japan .................................. 49-50720

[51] Int. Cl.² .............................................. G03B 3/00
[52] U.S. Cl. .................................... 354/196; 354/198; 354/289
[58] Field of Search .............. 354/195, 196, 272, 202, 354/286, 46, 289, 198; 350/255

[56] References Cited

U.S. PATENT DOCUMENTS

| | | | |
|---|---|---|---|
| 3,021,774 | 2/1962 | Ewald | 354/289 X |
| 3,067,663 | 12/1962 | Kremp | 354/198 |
| 3,221,628 | 12/1965 | Mahn | 354/196 |
| 3,447,441 | 6/1969 | Ort | 354/196 |
| 3,494,271 | 2/1970 | Muryor | 350/255 |
| 3,680,459 | 8/1972 | Okura | 354/196 |

Primary Examiner—Edna M. O'Connor
Attorney, Agent, or Firm—Christensen, O'Connor, Garrison & Havelka

[57] ABSTRACT

A camera lens barrel suitable for flash photography, wherein flash guide numbers are marked either on the distance adjusting ring or the diaphragm value adjusting ring, is disclosed. The distance adjusting ring and the diaphragm value adjusting ring are so arranged that the rotational angle of the distance adjusting ring required to increase the distance gradation value by the $\sqrt{2}$ is equal to the rotational angle of the diaphragm value adjusting ring at that time. A clutch mechanism is mounted in the camera lens barrel and arranged so that the distance adjusting ring and the diaphragm value adjusting ring are coupled together during flash photography. The coupling is such that the distance adjusting ring and the diaphragm value adjusting ring are connected together at a relative angular position corresponding to a flash guide number. The clutch mechanism includes a handle and a clutch member moved by the handle between a distance adjusting ring and diaphragm value adjusting ring coupling position (during flash photography) and a distance adjusting ring and the diaphragm value adjusting ring decoupling position (during normal daylight photography). In addition, a depth of field scale, related to flash guide numbers, is marked on the camera lens barrel in a position such that it is exposed when the clutch member is in its coupling position and hidden when the clutch member is in its decoupling position.

6 Claims, 6 Drawing Figures

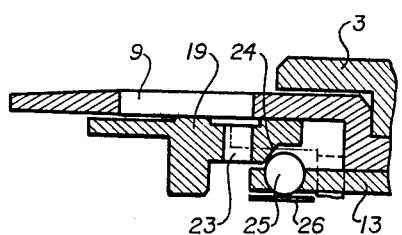
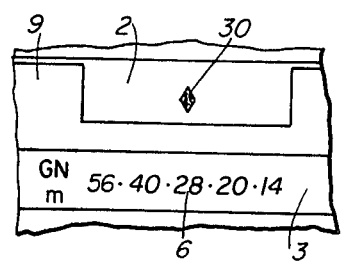
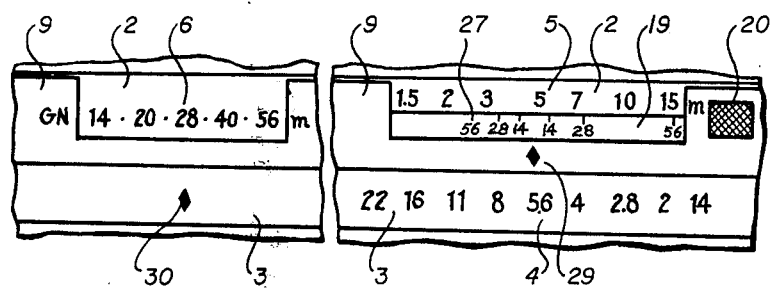
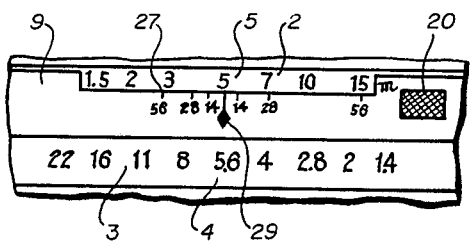

CAMERA LENS BARREL SUITABLE FOR FLASH PHOTOGRAPHY

BACKGROUND OF THE INVENTION

This invention generally relates to camera lens barrels and, more particularly, to camera lens barrels suitable for use in flash photography.

In a known camera lens barrel, flash guide numbers are marked either on the distance adjusting ring or the diaphragm value adjusting ring. The distance adjusting ring, which contains distance gradations on its outer circumference, and the diaphragm value adjusting ring, which contains diaphragm value graduations on its outer circumference, are so arranged that when the value of each ring is increased by the $\sqrt{2}$, these two rings are rotated by an equal rotation angle. For example, if the distance value is changed from 5m to 7m (5 $\times\sqrt{2} \cong 7$), the diaphragm value is changed from 5.6 to 4 (4 $\times\sqrt{2} \cong 5.6$). A clutch member mounted in said camera lens barrel is so arranged that, in flash photography, it connects the distance adjusting ring and the diaphragm value adjusting ring at a relative angular position determined by the flash guide number. In such a lens barrel, it is known that the use of a cam helicoid for the purpose of shifting the lens can be used. The use of the cam helicoid eliminates a lever, string and cam plate which are indispensible in lens barrels that use a screw helicoid arrangement to affect the distance adjustment and diaphragm adjustment in association with each other. The lens barrel of the present invention employs a cam helicoid arrangement for shifting the lens.

For the convenience of distance adjustment and TTL photography, single lens reflex cameras generally employ a preset automatic diaphragm device. Such devices allow the viewfinder image to be more readily visible because the diaphragm is kept in its full-open position during initial distance adjustment. The depth of field for a given diaphragm value is determined through the viewfinder by stopping down the diaphragm to the given value. This action is normally performed by operating a depth of field determining lever arranged either on the side of the camera or lens. In flash photography, however, the subject is dark and it is impractical to determine the depth of field through the viewfinder.

In a conventional camera lens barrel of screw helicoid-type, there is a linear relationship between the rotation angle of the distance adjusting ring and the lens shifting quality. Accordingly, if a given diaphragm value is expressed by F, the lead of the screw helicoid by L and the resolving power of the eye by δ, then the indicated position Ⓗ of the depth of field's gradation at the given diaphragm value may be expressed by the following equation:

$$\text{Ⓗ} = \pm 360 \cdot \delta F / L \tag{1}$$

(where δ normally equals the focal length divided by 1500).

In a lens barrel of cam helicoid-type, however, the relationship between the rotation angle of the distance adjusting ring and the lens shifting quality is not the same. Unlike a lens barrel of the screw helicoid-type, it is impossible in a lens barrel of the cam helicoid type to indicate the depth of field's gradation for a given diaphragm value. Thus, the use of such a lens in flash photography results in the encountering of a difficulty in determining the depth of field.

Therefore, it is an object of this invention to provide a new and improved camera lens barrel suitable for use in flash photography.

It is another object of this invention to provide a new and improved clutch arrangement suitable for coupling a distance adjusting ring to a diaphragm value adjusting ring during flash photography.

It is yet another object of this invention to provide a new and improved arrangement for coupling a distance adjusting ring to a diaphragm value adjusting ring in a camera lens barrel that employs a cam helicoid for shifting the lens.

SUMMARY OF THE INVENTION

In accordance with principles of this invention, a camera lens barrel suitable for use in flash photography is provided. Flash guide numbers are marked either on the distance adjusting ring or the diaphragm value adjusting ring. The distance adjusting ring and the diaphragm value adjusting ring are so arranged that the rotational angle of the distance adjusting ring required for increasing the distance gradation value by the $\sqrt{2}$ is equal to the rotational angle of the diaphragm value adjusting ring at that time. A clutch mechanism is provided and arranged so that, during flash photography, the distance adjusting ring and the diaphragm value adjusting ring are connected together at a relative angular position corresponding to the flash guide number. In addition, a depth of field scale related to flash guide numbers is marked on the camera lens barrel.

In accordance with further principles of this invention, the clutch mechanism includes a clutch member slidably only in the direction of the optical lens barrel. The clutch mechanism also includes a handle attached to the clutch member, and operable from a position external to the lens barrel.

In accordance with still further principles of this invention, the depth of field scale is marked on the outer circumference of a movable member that is positioned such that the depth of field scale is visible only during flash photography, i.e., when the diaphragm value adjusting ring is coupled to the distance adjusting ring.

It will be appreciated from the foregoing description that the invention provides a new and improved apparatus for use in a camera lens barrel. The apparatus allows a depth of field to be readily "read" from the camera lens barrel during flash photography. Moreover, the apparatus includes a clutch mechanism that readily allows the distance adjusting ring and the diaphragm value adjusting ring of a cam helicoid lens barrel to be coupled together at a predetermined rotation value, determined by a flash guide number. This arrangement overcomes prior art problems related to such coupling in cam helicoid lens barrels. The clutch mechanism is relatively uncomplicated in that it merely includes an uncomplicated clutch member that is movable between a normal photographing position and a flash photographing position. This same movement causes the depth of field scale to be moved between invisible and visible positions.

BRIEF DESCRIPTION OF THE DRAWINGS

The foregoing objects and many of the attendant advantages of this invention will become more readily appreciated as the same becomes better understood by reference to the following detailed description of a preferred embodiment of the invention when taken in conjunction with the accompanying drawings wherein:

FIG. 3 is a fragmented sectional view of a portion of the lens barrel illustrated in FIG. 2 and illustrates a click stop mechanism;

FIG. 4 is a plan view illustrating various scales marked on the lens barrel illustrated in FIGS. 2 and 3;

FIG. 5 is a plan view illustrating scales similar to those illustrated in FIG. 4 position in a different manner; and, FIG. 6 is a plan view illustrating an alternate arrangement of a portion of the embodiment illustrated in FIG. 4.

DESCRIPTION OF THE PREFERRED EMBODIMENT

Figure 1:
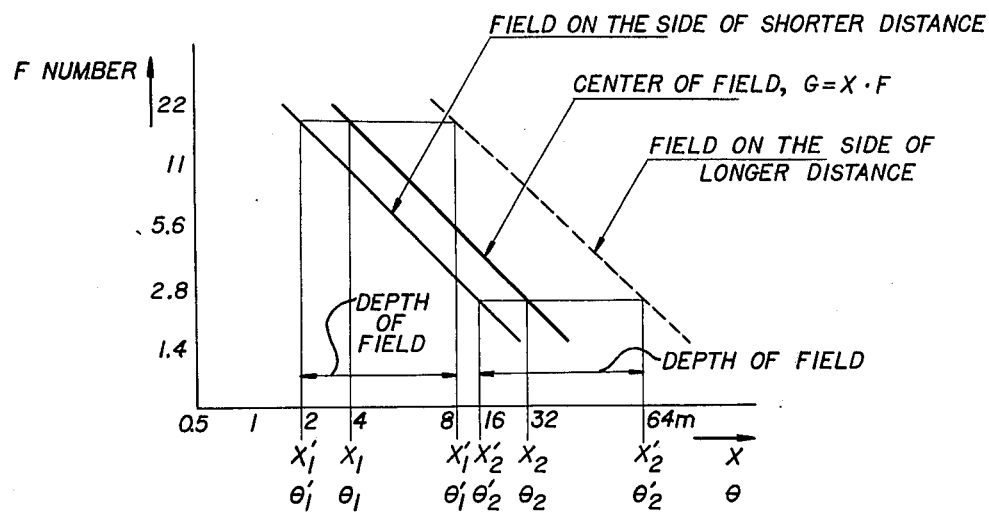
FIG. 1 is a graph displaying depth of field vs flash guide numbers, and is used to explain the depth of field gradations (scale) of the present invention.

In order to provide a better understanding of the operation of the invention, a discussion of the relationship between flash guide numbers and depth of field is first set forth. In this regard, attention is directed to FIG. 1. If the angular positions of a pair of distance gradations $X_1$ and $X_2$ are represented by $\theta_1$ and $\theta_2$, respectively, then the following relationship will be established:

$$\theta_1 = \theta_a + \theta \cdot \log 2(X_1/X_a) \tag{2A}$$

$$\theta_2 = \theta_a + \theta \cdot \log 2(X_2/X_a) \tag{2B}$$

where, $X_a$ is a reference photographing distance, $\theta_a$ is the angular position of the reference photographing distance gradation and $\theta$ is a rotational angle of the diaphragm value adjusting ring required to vary the diaphragm value by 2EV. From equations (2A) and (2B) the following equation can be obtained:

$$\theta_1 - \theta_2 = \cdot \log 2(X_1/X_2) \tag{3}$$

If the flash guide number is expressed by G and the diaphragm values at photographing distances $X_1$ and $X_2$ are expressed by $F_1$ and $F_2$, respectively, then the following relationships exist:

$$G = X_1 \cdot F_1 = X_2 \cdot F_2 \tag{4}$$

The depths of focus $\Delta_1$ and $\Delta_2$ for the diaphragm values $F_1$ and $F_2$ can be expressed as:

$$\Delta_1 = \pm \delta \cdot F_1 \tag{5A}$$

$$\Delta_2 = \pm \delta \cdot F_2 \tag{5B}$$

If the lens shifting quality is expressed by $dx$, the focal length expressed by $f$ and the spacing between the principle point expressed by H, then the photographing distance X may be expressed by the following equation:

$$X = (f^2/dx) + 2 \cdot f + dx + H \tag{6}$$

In ordinary photographing lenses, the shortest photographing distance is in the range of $10 \cdot f$. In the range of $X \geq 10 \cdot f$, since $dx/X$ and $H/X$ are nearly equal to zero, equation (6) may be rewritten as the following approximate equation:

$$X = (f^2/dx) + 2 \cdot f \tag{7}$$

Accordingly, if the subject distances at the photographing distances $X_1$ and $X_2$, or for the diaphragm values $F_1$ and $F_2$, are expressed by $X_1'$ and $X_2'$, respectively, and if $X_2$ is expressed by $k \cdot X_1$ ($k = F_1/F_2$), then $X_1'$ and $X_2'$ may be expressed by the following equations:

$$X_1' = \frac{f^2 \cdot X_1^2 \pm G \cdot \delta (X_1 - 2 \cdot f) \cdot 2 \cdot f}{f^2 \cdot X_1 \pm G \cdot \delta (X_1 - 2 \cdot f)} \tag{8A}$$

$$X_2' = \frac{k^2 \cdot f^2 \cdot X_1^2 \pm G \cdot \delta (K \cdot X_1 - 2 \cdot f) \cdot 2 \cdot f}{k \cdot f^2 \cdot X_1 \pm G \cdot \delta (k \cdot X_1 - 2 \cdot f)} \tag{8B}$$

If the angular difference between the photographing distances $X_1$ and $X_2$ and the subject distances $X_1'$ and $X_2'$, which appear on the distance adjusting ring, are expressed by $\Delta\theta_1$ and $\Delta\theta_2$, respectively, these angular differences may be expressed by the following equations:

$$\Delta\theta_1 = \theta \cdot \log 2 \frac{X_1'}{X_1} \tag{9A}$$

$$\Delta\theta_2 = \theta \cdot \log 2 \frac{X_2'}{X_2} \tag{9B}$$

It follows therefrom that the difference between these angular distances may be expressed by the following equation:

$$\Delta\theta_1 - \Delta\theta_2 = \theta \cdot \log 2 [\frac{X_2}{X_1} - \frac{X_1'}{X_2'}] = \theta \cdot \log 2 [k \cdot \frac{X_1'}{X_2'}] \tag{10}$$

From equations (8A) and (8B):

$$\frac{X_1'}{X_2'} = \frac{k(f^2 \pm G \cdot \delta \cdot f)X_1^3 \pm 2(k-1) \cdot G \cdot \delta \cdot f^2 \cdot X_1^2 + A}{k^2(f^2 \pm G \cdot \delta \cdot f)X^3 \pm 2 \cdot k \cdot (k-1) \cdot G \cdot \delta \cdot f^2 \cdot X^2 + A} \tag{11}$$

where $A = 2 \cdot G^2 \delta - 2 \cdot k \cdot X_1^2 \Delta G \cdot \delta (G \cdot \delta \cdot f \pm f^2 \cdot k + G \cdot \delta \cdot f \cdot k(X_1 + 8 \cdot G^2 \cdot \delta^2 \cdot f^2$.

Thus, equation 11 may be simplified as follows:

$$\frac{X_1'}{X_2'} = \frac{1}{k} \pm f(G \cdot k \cdot X_1) \tag{12}$$

In equation 12, $f(G, k, X_1)$ is an increasing function of $G$ and $X_1$ and, from equation (4), $X_1 = G/(k \cdot F_2)$. Therefore, $f(G, k, X_1)$ reaches a maximum value when $G$ and $X_1$ becomes maximum and $k$ becomes minimum.

By way of example, assuming that a lens of $f = 50$mm, $H/10 \cdot f = 0$, diaphragm full aperture $= 1.414$ and minimum diaphragm aperture $= 22.627$, is used with a flash having $G = 56$m as the maximum flash guide number, then:

$X_1 = 40$m, $X_2 = 2.5$m $X_1' = 22.827$m (on the side of shorter distance)
156.350m $X_2' = 1.493$m (on the side of shorter distance)
8.751m Therefore, $X_1'/X_2' = 15.289$ (on the side of the shorter distance)

$X_1'/X_2' = 17.867$

In addition, since $k = 1/16$, then $$f(G,k,X_1) = F(56, 1/6, 40) + 2.867 = 31\ 0.711.$$

Substituting the values of $X_1'/X_2'$ into equation (10) gives:

$$\Delta\theta_1 - \Delta\theta_2 = \theta \cdot \log 2\ 15.289/16 = -0.065 \cdot \theta$$

$$\Delta\theta_1 - \Delta\theta_2 = \theta \cdot \log 2\ 17.867/16 = 0.169 \cdot \theta$$

Since the value of $\theta$ is normally in the range of 14°–20°, the maximum value of $\theta_1-\theta_2$ is in the range of 2.2°–3.2°. Suppose now that $\theta$ is 20°, then, at $X_1 = 40$m, the depth of field's gradation for $G = 56$m will be 16.18° (on the side of shorter distance) and 39.32° (on the side of longer distance) and at $X_2 = 2.5$m it will be 14.86° (on the side of shorter distance) and 36.14° (on the side of longer distance). Therefore, taking the accuracy of the diaphragm aperture and distance gradation into consideration, it will be enough for practical purposes to set the depth of field's gradation for $G = 56$m to 15.5° (on the side of shorter distance) and 37.5° (on the side of longer distance).

The foregoing equations and discussion describe selecting the maximum value of the flash guide number and the diaphragm value such that a depth of field's gradation can be displayed on the basis of a flash guide number. The end result of this relationship is the provision of a flash guide number and depth of field relationship for a chosen camera lens that is useful during flash photography. The following description describes structures which utilize this information to provide a camera lens barrel suitable for use in flash photography.

Figure 2:
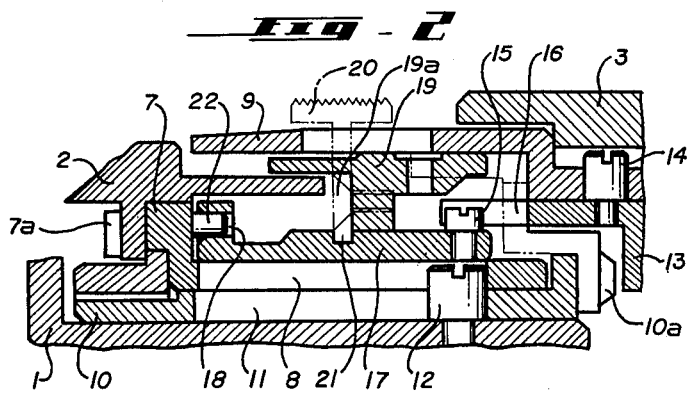
FIG. 2 is a fragmented sectional view of the main portion of a lens barrel including a preferred embodiment of the invention.

FIGS. 2–4 illustrate a first embodiment of the invention in fragmented form, nonessential components having been eliminated. FIG. 2 illustrates a lens sleeve 1 adapted to hold therein lenses and a preset automatic diaphragm device (not shown). A distance adjusting scale 5 and a flash guide number scale 6 are marked on the outer circumference of a distance adjusting ring 2 so that every time the distance adjusting ring 2 is rotated for a preselected constant angle, the gradation of each scale is increased by the $\sqrt{2}$. In addition, a diaphragm adjusting ring 3 carries a diaphragm scale 4 on its outer circumference.

A cam frame 7 is integral with or affixed to the distance adjusting ring 2, by for example a bolt 7a. A cam groove 8, lying along an axis parallel to the optical axis defined by the lens sleeve 1, is formed in the cam frame 7. A guide ring 10 surrounding the lens sleeve 1 includes a guide groove 11. The guide groove 11 is generally aligned with the cam groove 8, and the guide ring 10 is integral with or affixed to (by a bolt such as 10a) to a lens cylinder. The lens cylinder 9 generally surrounds and is spaced from the guide ring 10 and the cam frame 7. A cam pin 12 affixed to the lens sleeve 1 projects into both the cam groove and the guide groove so that, as the distance adjusting ring 2 is rotated, the lens sleeve 1 is moved back and forth along the optical axis in a conventional manner. By means of a coupling pin 14, a diaphragm ring 13 adapted to adjust the diaphragm value (not shown) is connected to a diaphragm value adjusting ring 3.

A clutch mechanism is located in the space between the cam frame 7 and the lens cylinder 9. The clutch mechanism primarily comprises a clutch member 17, an actuation member 19, and a handle 20. For ease of description, the end of the clutch mechanism nearest the diaphragm value adjusting ring will be referred to as the diaphragm end, and the end nearest the distance adjusting ring will be referred to as the distance end. A connecting pin 15 affixed to the diaphragm end of the clutch member 17 lies in a groove 16 formed in the diaphragm ring 13, whereby the clutch member 17 rotates together with the diaphragm ring 13.

The clutch member lies parallel to the optical axis of the overall lens and includes a plurality of holes 18 located at its distal end. The holes have axes parallel to the optical axis and face the cam frame 7. The plurality of holes 18 are located such that they are associated with the flash guide number scale 6 illustrated in FIG. 4. The clutch member 17 is movable back and forth along the optical axis (right and left as illustrated in FIG. 2) by the handle 20. The handle 20 is generally T-shaped in cross section and has an outer surface located beyond the outer surface of the lens cylinder 9 that is serrated in a manner which allows it to be frictionally engaged by the thumb or finger of a user. The inwardly projecting leg of the handle 20 lies in a circumferential groove 21 formed in the outer surface of the clutch member 17.

The actuation member 19 of the clutch mechanism is affixed by a screw 19a to the inwardly projecting leg of the handle 20. The actuation member 19 and, thus, the clutch member 17, are slidable only in the direction of the optical axis under the regulation of a notched portion of the lens cylinder 9.

It will be appareciated from the foregoing description that as the handle 20 is moved back and forth (right to left and vice versa), the clutch member 17 and the actuation member 19 both move back and forth. The groove 16 formed in the diaphragm ring 13 allows the pin 15 to move back and forth without loss of engagement between the clutch member and the diaphragm ring. This movement moves the holes 18 from a point where they are adjacent to the cam frame 17 to a point remote therefrom.

A clutch pin 22 is affixed to the cam frame 7 in a position such that the holes 18 can be aligned therewith. The clutch pin operatively connects and disconnects the distance adjusting ring to the clutch member 17. Since the clutch member 17 is operatively connected to the diaphragm adjusting ring 3 via the diaphragm ring 13, the pin and holes affectively connect these members together when the pin 22 is engaged in one of the holes 18. Such engagement occurs when the clutch member is in its leftmost position, as illustrated in FIG. 2.

The actuation member 19 includes click stop holes 23 (FIG. 3). The click stop holes cooperate with a ball 25 held in place by a spring 23 about the periphery of the diaphragm ring 13. A click stop releasing portion 24 formed by an undercut region in the actuation member 19 and the click stop holes 23 are cooperative to act as a click stop means for the actuation member 19, i.e., the actuation member 19 can be held in either of two positions, a rightmost position or a leftmost position, the leftmost position being illustrated in FIGS. 2 and 3.

A scale 27 representing depth of field is marked on the outer surface of the actuation member 19. The scale is marked in relationship to flash guide numbers. In the embodiment of the invention illustrated in FIG. 4, the handle 20 is set at the position for flash photography, i.e., the clutch member 17 and the actuation member 19 are in their leftmost position whereat the clutch pin 22 lies in one of the holes 18. In the position for ordinary daylight photography, the actuation member 19 and the clutch member 17 are moved to the rightmost position whereat the clutch pin 22 does not lie in any of the holes 18. In this position, the depth of field scale 27 is invisible because it is covered by the lens cylinder 9. An indicium 29 for adjusting distance and diaphragm aperture parameters is marked on the outer circumference of the lens cylinder 9 adjacent the depth of field scale 27. A second indicium 30 for flash guide numbers is formed on the outer surface of the diaphragm value adjusting ring 3 adjacent the flash guide numbers 6.

As noted above, the positioning of the depth of field's scale gradations in relationship to the flash guide number 6 is created in accordance with the equations discussed above. These equations result in the placement of indicia for depth of field in accordance with a particular flash guide number, the flash guide number controlling the coupling of the distance adjusting ring and the diaphragm value adjusting ring together, as hereinafter described in the description of the operation of the embodiment of the invention illustrated in FIGS. 2-4.

Turning now to the operation of the embodiment of the invention illustrated in FIGS. 2-4, in ordinary daylight photographing operation, the handle 20 is rightwardly displaced from the position illustrated in FIG. 2 whereby the clutch pin 22 is disengaged. Thus, the distance adjusting ring 2 is disconnected from the diaphragm value adjusting ring 3. Moreover, the click stop means formed by aperture 23, ball 25 and spring 26 are in a position such that the diaphragm value adjusting ring 3 is held at its rightmost position. In this position, the depth of field scale 27 is covered by the lens cylinder 9 and is not visible.

In the case of flash photography, a flash guide number 6, which is determined by the nature of the flashbulb employed, is brought in line with the indicium 30 marked on the diaphragm value adjusting ring 3. Then, the handle 20 is displaced to the left so as to achieve the position illustrated in FIG. 2, whereat the clutch pin 22 is engaged in one of the holes of the plurality of holes 18, the particular hole being related to the particular flash guide number. This connection operationally connects the distance adjusting ring 2 to the diaphragm value adjusting ring 3 at a relative angular position corresponding to the flash guide number. Thereafter, rotation of either of the rings maintains this relative angular position via the clutch member 17. In addition, the movement of the handle 20 to its flash photographing position uncovered the depth of field scale 27 which now becomes visible. Thus, the depth of field for the chosen flash guide number is readily determined by reading the gradation which is in line with the indicium 29.

FIG. 5 illustrates a modified arrangement of the indicia location. More specifically, FIG. 5 illustrates an embodiment of the invention wherein the depth of field scale 27 is located on the surface of the lens cylinder 9, rather than on the distance adjusting ring 2. However, the operation and function of the physical structure operates in a similar manner to provide the intended results of the invention, i.e., an indication of depth of field for a particular flash guide number.

FIG. 6 illustrates a modified arrangement of the embodiment of FIG. 4. More specifically, FIG. 6 illustrates an embodiment of the invention wherein the flash guide number scale 6 is marked on the outer circumference of the diaphragm adjusting ring 3 and the indicium 30 is marked on the outer circumference of the distance adjusting ring 2.

In conclusion, it will be appreciated that the invention generally comprises an arrangement wherein flash guide numbers are utilized to provide a preadjustment position for connecting a distance adjusting ring to a diaphragm value adjusting ring. The physical mechanism of the preferred embodiment comprises a clutch member whose angular position, prior to connection to the distance adjusting ring is controlled by the diaphragm adjusting ring. This is performed by a pin that lies in a groove formed in the diaphragm ring. Thus, during normal daylight photographing, the position of the clutch member, even though disengaged, is controlled by the positioning of the diaphragm value adjusting ring. During flash photography, the clutch member is moved to a position whereat a clutch pin affixed to the distance adjusting ring lies in one of a plurality of holes formed in the clutch member. Thereafter, movement of either the diaphragm value adjusting ring or the distance adjusting ring also results in the movement of the other ring. Further, an indicium in the form of a depth of field scale is exposed when the clutch member is in its flash photography position and hidden when the clutch member is in its ordinary daylight photographing position.

While a preferred embodiment of the invention has been illustrated and described, it will be appreciated that various changes can be made therein without departing from the spirit and scope of the invention. Hence, the invention can be practiced otherwise than as specifically described herein.

The embodiments of the invention in which an exclusive property or privilege is claimed are defined as follows:

1. In a camera lens barrel suitable for use in flash photography wherein: (a) flash guide numbers are marked either on a distance adjusting ring or a diaphragm value adjusting ring; (b) the distance adjusting ring and the diaphragm value adjusting ring are formed such that the rotation angle of the distance adjusting ring required for increasing the distance gradation value by the $\sqrt{2}$ during flash photography is equal to the rotation angle of the diaphragm value adjusting ring at that time; and, (c) a clutch member including an actuation member is included and formed such that, during flash photography, the clutch member is capable of connecting the distance adjusting ring to the diaphragm value adjusting ring at a relative angular position corresponding to a flash guide number, the improvement comprising depth of field indicating means carried by said actuation member for indicating a depth of field related to the flash guide number corresponding to the relative angular position between the distance adjusting ring and the diaphragm value adjusting ring.

2. the improvement claimed in claim 1 wherein said clutch member is movable between flash photography and ordinary daylight photography positions, said flash photography position being a position whereat said clutch member connects said diaphragm value adjusting ring to said distance adjusting ring and said ordinary daylight photography position being a position whereat said clutch member does not connect said diaphragm adjusting ring to said distance adjusting ring.

3. The improvement claimed in claim 1, wherein said clutch member is continuously connected to said diaphragm value adjusting ring and disconnectably connected to said distance adjusting ring.

4. The improvement claimed in claim 1, wherein said clutch member includes a handle and wherein said clutch member is connected to said diaphragm value adjusting ring by a pin and groove mechanism, said groove mechanism adapted to engage said handle.

5. The improvement claimed in claim 1, wherein said clutch member includes a plurality of holes adapted to be connected to a pin affixed to said distance adjusting ring when said clutch member is in said flash photography position.

6. The improvement claimed in claim 1, wherein said depth of field indicating means is a depth of field scale externally viewable when said clutch member is in said flash photography position and not externally viewable when said clutch member is not in said flash photography position.

* * * * *

UNITED STATES PATENT AND TRADEMARK OFFICE
CERTIFICATE OF CORRECTION

PATENT NO. : 4,071,850

DATED : January 31, 1978

INVENTOR(S) : Zenichi Okura

It is certified that error appears in the above-identified patent and that said Letters Patent are hereby corrected as shown below:

Column 4, line 15 (Equation 8B) delete "(K" and insert —(k—.

Column 4, lines 45 and 46, delete the lines in their entirety and insert therefor:

—where $A = 2 \cdot G^2 \cdot \delta^2 \cdot k \cdot X_1^2 - \Delta G \cdot \delta(G \cdot \delta \cdot f \pm f^2 \cdot k + G \cdot \delta \cdot k)X_1 + 8 \cdot G^2 \cdot \delta^2 \cdot f^2$ —.

Column 5, lines 2-7, delete the lines in their entirety and insert therefor:

—In addition, since $k = 1/16$, then $f(G, k, X_1) = F(56, 1/6, 40) = {}^{+2.867}_{-0.711}$ —

Column 5, line 55, after "affixed" delete "to".

Column 6, line 48, delete "affectively" and insert therefor —effectively—.

Signed and Sealed this

Eleventh Day of July 1978

[SEAL]

Attest:

RUTH C. MASON
Attesting Officer

DONALD W. BANNER
Commissioner of Patents and Trademarks